Oct. 15, 1935.   E. C. LONG   2,017,348
INTERNAL COMBUSTION ENGINE PISTON
Filed Aug. 13, 1919
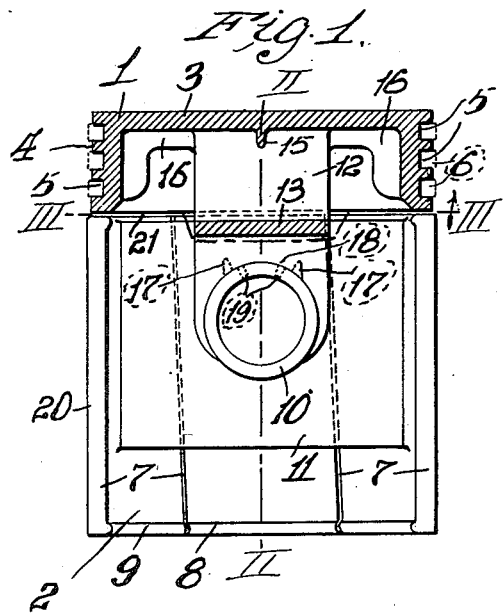
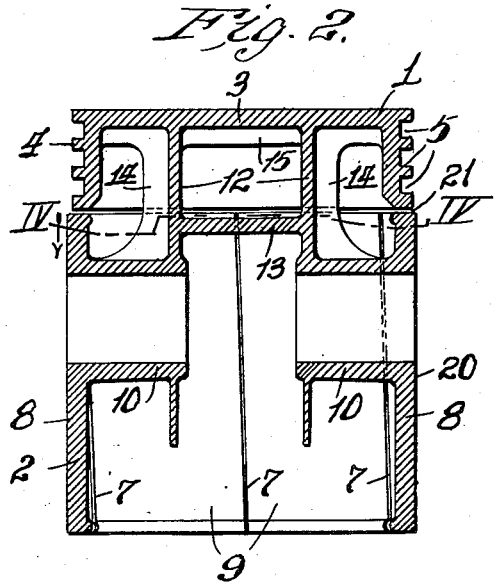
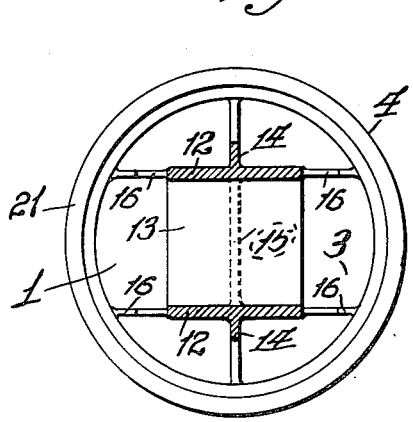
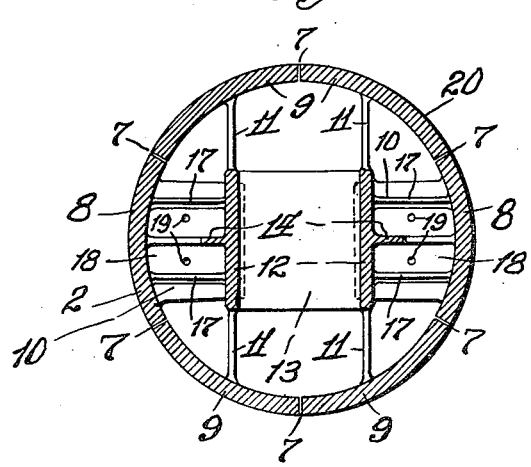
Inventor:
Elmer C. Long
By H. G. Fletcher
atty.

Patented Oct. 15, 1935

2,017,348

UNITED STATES PATENT OFFICE 2,017,348

INTERNAL COMBUSTION ENGINE PISTON

Elmer C. Long, Quincy, Ill., assignor, by mesne assignments, to Security Trust Company, Detroit, Mich., a corporation of Michigan Application August 13, 1919, Serial No. 317,273

4 Claims. (Cl. 309—11)

The main object of this invention is to provide an improved piston for internal combustion engines, in which the skirt or cylinder bearing portion of the piston and the piston ring supporting portion of the piston are independently related relative to expansion and contraction thereof.

Another object is to provide an improved one-piece piston which has the peripheries of the cylinder bearing portion and the piston ring supporting portion, separated from one another.

A further object is in providing an improved piston having a pair of separated peripheries that are supported from the wrist pin bearings of the piston.

Other and further objects will appear in the specification and be specifically pointed out in the appended claims, reference being had to the accompanying drawing exemplifying the invention, and in which, Figure 1 is a vertical section taken through this improved piston.

Figure 2 is a vertical section taken on the line II—II of Fig. 1.

Figure 3 is a horizontal inverted section taken on the line III—III of Fig. 1.

Figure 4 is a horizontal section taken approximately on the line IV—IV of Fig. 2.

Referring to the drawing, this improved piston is constructed of one piece and comprises portions 1 and 2, the portion 1 having the closed end or head 3, and the periphery 4 thereof being provided with a plurality of piston ring recesses 5 for the support of the piston rings 6, said portion 1 forming the piston ring support. The portion 2 which is the cylinder bearing portion of the piston or skirt portion is provided with a plurality of longitudinally extending and inclining slots 7, forming a plurality of cylinder bearing sections 8 and 9, the sections 8, of which there are two, are oppositely disposed from one another and are formed integral with a respective wrist pin bearing 10, whereas each section 9 is formed integral with a respective rib 11, said ribs 11 extending from respective wrist pin bearings 10. Depending interiorly from the head 3 of the portion 1 of the piston is a pair of integrally formed webs 12, which engage and are each formed integral with a respective wrist pin bearing 10.

Formed integral with said webs 12 and arranged therebetween is a cross member 13. Extending outwardly from each of said webs 12 is a rib 14, each of said ribs 14 serving as reinforcements to said webs and to their respective wrist pin bearing 10 and to the head 3 of the piston, and tying said webs 12 together at their upper ends is a rib 15.

Extending from each end of each web 12 and arranged interiorly against the under side of the portion 1 are ribs 16. Formed on top of each wrist pin bearing 10 is a pair of lips 17, said lips at their ends adjoining respective cylinder bearing sections 8 and webs 12, the space provided between each pair of lips 17 forming oil pans 18, and leading from each pan are oil openings 19.

In the manufacture of this improved piston, it is first cast solid, then the periphery of the piston is machine turned, and in which the periphery 4 of the portion 1 will be turned to a lesser diameter than the periphery 20 of the portion 2; then the piston is cut or slotted circumferentially as designated at 21, after which the longitudinal slots 7 are made in the portion 2, thereby providing the cylinder bearing sections 8 and 9.

In the operation of an improved piston of this character, the sole purpose of the portion 1 thereof is for receiving the explosive force of the ignited gas in the firing chamber and for supporting the piston rings, the piston rings yieldingly bearing against the cylinder wall of the cylinder, whereas the cylinder bearing portion 2 or skirt portion of the piston serves as the guiding element to the piston in which the cylinder bearing sections surfaces 8 and 9 thereof will at all times bear against the wall of the cylinder.

Therefore, in order to adapt this improved piston to the peculiar conditions of a cylinder in an internal combustion engine, the circumferential slot 21 is provided so as to separate the piston ring supporting portion 1 from the cylinder bearing portion 2 so that the extreme expansion of the portion 1 cannot be carried to the cylinder bearing portion 2, in which each end of the piston can independently expand and contract relative to the thermal conditions at the opposite ends of the cylinder, as the heat units cannot directly travel from the portion 1 to the portion 2.

The provision of the plurality of cylinder bearing sections 8 and 9 of the portion 2 of the piston is for the purpose of providing more of a resiliently yielding guiding fit between the piston and its cylinder relative to the expansion and contraction thereof, as it is not necessary for the cylinder bearing portion of the piston to act as a packing agent as such duty is carried out by the piston rings supported by the portion 1, said cylinder bearing portion 2 of the piston merely being the guiding element thereto. During the reciprocation of this improved piston in the cylinder, oil will be forced through the circumferential slot 21, down the inside wall of the portion 2 into the respective oil pans 18, from which the oil will be fed to the wrist pin and wrist pin bearings through the oil openings 19.

Having thus described the invention so that those skilled in the art will be able to practice the same, what I desire to secure by Letters Patent is defined in what is claimed, it being understood that various changes in the device shown and described above in detail and not amounting to invention, may be made without departing from the spirit and scope of my invention.

What I claim is:

1. A piston having a solid end portion and a skirt portion which is adapted to engage substantially the entire circumferential wall of the cylinder in which it reciprocates, said piston being provided with an annular slot cut entirely through the thickness of its peripheral wall, said skirt portion having a series of sections which are wholly separated from one another each extending from the open end of the piston to said annular slot, said skirt portion having a pair of wrist pin bearings formed integral therewith, and a rib extending from a respective bearing to a respective section.

2. A one-piece piston having a solid end portion and a skirt portion which is adapted to engage substantially the entire circumferential wall of the cylinder in which it reciprocates, said piston being provided with an annular slot cut entirely through the thickness of its peripheral wall, said skirt portion being divided into a series of sections which are wholly separated from one another and each extending from one end of the skirt portion to said annular slot, a pair of pin bearings depending from said solid end portion, each of said pin bearings being directly connected to one of a pair of opposed sections of said series of sections and supporting the same, and a series of ribs extending from said pin bearings, each of said ribs supporting one section of said series of sections.

3. A one-piece piston comprising a head portion; a cylindrical skirt portion, said head and skirt being completely separated by an annular slot, said skirt being divided into a plurality of separated sections by longitudinal slots which extend from the lower end of said skirt upwardly to said annular slot; and a pair of pin bosses depending into said skirt from said head, each of said pin bosses being connected by ribs to a pair of oppositely disposed sections of said skirt, each of said pin bosses also being integrally connected with a respective skirt section disposed intermediate said pair of oppositely disposed skirt sections.

4. A homogeneous unitary piston comprising a head; a skirt; and piston pin bosses depending from said head into said skirt, said skirt being spaced from said head by an annular slot and divided into six sections by a like number of longitudinal slots, one half of the sections comprising said skirt being respectively connected to and solely supported by one of said depending piston pin bosses.

ELMER C. LONG.